United States Patent [19]

Frohbieter

[11] 4,176,528
[45] Dec. 4, 1979

[54] CONVEYOR BELT FOR ICE DISPENSER

[75] Inventor: Edwin H. Frohbieter, Stevensville, Mich.

[73] Assignee: Whirlpool Corporation, Benton Harbor, Mich.

[21] Appl. No.: 922,672

[22] Filed: Jul. 7, 1978

[51] Int. Cl.$^2$ .............................................. F25C 5/18
[52] U.S. Cl. ...................................... 62/344; 198/688; 198/853
[58] Field of Search .............. 198/688, 698, 699, 853, 198/; 62/344

[56] References Cited

U.S. PATENT DOCUMENTS

| | | | |
|---|---|---|---|
| 745,361 | 12/1903 | Levalley | 198/688 X |
| 1,532,807 | 4/1925 | Getting et al. | 198/688 X |
| 1,547,276 | 7/1925 | Wentz | 198/699 |
| 1,638,267 | 8/1927 | Morehead et al. | 198/688 |
| 2,243,145 | 5/1941 | Batchell | 198/189 |
| 2,335,417 | 11/1943 | Huston | 198/688 |
| 2,712,760 | 7/1955 | Patz et al. | 198/853 X |
| 3,091,129 | 5/1963 | Bessette | 74/229 |
| 3,123,048 | 3/1964 | Cordis | 119/52 |
| 3,146,539 | 9/1964 | Speno et al. | 198/688X |
| 3,215,256 | 11/1965 | McAuley | 198/168 |
| 3,262,546 | 7/1966 | McAuley et al. | 198/172 |
| 3,262,547 | 7/1966 | McAuley et al. | 198/173 |
| 3,262,548 | 7/1966 | McAuley et al. | 198/173 |
| 3,338,376 | 8/1967 | Cross | 198/688 X |
| 3,407,918 | 10/1968 | Clarke | 198/688 X |
| 3,514,941 | 6/1970 | Mueller | 59/35 |
| 3,842,963 | 10/1974 | Kemper | 198/31 AC |
| 3,967,719 | 7/1976 | Kloefkorn et al. | 198/175 |
| 4,060,111 | 11/1977 | Burks | 141/231 |

Primary Examiner—William E. Wayner
Assistant Examiner—William E. Tapoleai, Jr.
Attorney, Agent, or Firm—Wagner, Stellman, McCord, Wiles & Wood

[57] ABSTRACT

A conveyor belt for use in an ice body maker adapted to transfer the formed ice bodies from a collecting space to a dispensing space. The conveyor belt is arranged to pick up the ice bodies temporarily stored in the collecting space and drop them into a suitable guide chute leading to an upper portion of the dispensing space so that a receiver disposed in the dispensing space may receive the desired qauantity of ice bodies for subsequent disposition as desired. The belt is formed of a plurality of link plates articulated by cooperating knuckles with each plate having a forward edge provided with upstanding cleats and a rearward edge provided with upstanding cleats. The cleats on the forward edge extend at an angle of less than 90° to the plane of the plate and the cleats on the rearward edge may extend at a greater angle to the plane of the plates. In the illustrated embodiment, the forward cleats extend at an angle of approximately 60° to the plate and the rearward cleats extend at an angle of approximately 90° to the plate. The belt may be entrained about upper and lower sprockets so as to extend at an upwardly forwardly directed angle so that the ice bodies picked up by the cleats are caused to be discharged into the dispensing space as a result of the cooperative functioning of the cleats and the flat surface of the link plates. The plates may be connected by hinges including open knuckles on the front and rear edges of the plates for facilitated maintenance and assembly.

13 Claims, 5 Drawing Figures

CONVEYOR BELT FOR ICE DISPENSER

BACKGROUND OF THE INVENTION

1. Field of the Invention

This invention relates to ice body makers and in particular to belts for use in transferring ice bodies from a collecting space to a dispensing space in ice body makers.

2. Description of the Prior Art

In U.S. Letters Patent No. 2,243,145 of G. W. Batchell, a paneled lehr belt is shown having interconnecting hinge means and upturned sidewalls.

In U.S. Pat. No. 3,123,048 of Nat Cordis, a conveyor is shown having interconnected links provided at one edge with a turned wall portion.

Georges H. N. Bessette, in U.S. Pat. No. 3,091,129, shows a chain and sprocket drive structure utilizing a quadrilateral sprocket wheel.

James H. McAuley, in U.S. Pat. No. 3,215,256, shows a flexible chain and its supporting and driving means composed of interlocking links and with outwardly projecting wall portions.

James H. McAuley et al, in U.S. Pat. No. 3,262,546, show a similar conveyor chain.

James H. McAuley et al show, in U.S. Pat. No. 3,262,547, a similar chain having a shelf portion for handling bulky feed or roughage material in a conduit or trough.

In U.S. Pat. No. 3,262,548, James H. McAuley et al show a flexible chain with bearing surfaces defining interconnected links having upstanding wall portions.

In U.S. Pat. No. 3,514,941, Clair W. Mueller shows a conveyor chain having integral knuckle means on the front and rear edges.

Kate Kemper, in U.S. Pat. No. 3,842,963, shows an apparatus for transporting pieces of dough in a proving cabinet.

Earl W. Kloefkorn et al show, in U.S. Pat. No. 3,967,719, a combine conveyor means having a transverse slat structure for use in a feeder house of a combine. The slat means have an inverted U-shaped cross-sectional configuration with finger means or hand means connected to and extending rearwardly from the slat means for engaging the grain in the feeder housing.

In U.S. Pat. No. 4,060,111, Howard L. Burks shows a conveyor having a plurality of blades extending approximately one-half the width of the belt with each successive blade being offset laterally relative to the preceding and following blade. The blades extend perpendicularly to the flat surface of the belt.

SUMMARY OF THE INVENTION

The present invention comprehends an improved conveyor belt for use in an ice body maker having means defining an ice body collecting space, means for making ice bodies and delivering them to the collecting space, and means defining an ice body dispensing space adapted to receive a removable ice body receiver into which the ice bodies are transferred from the collecting space. The invention comprehends an improved belt-type transfer means wherein a continuous flexible belt defined by a plurality of link plates articulated by cooperating knuckles is provided with a novel arrangement of cleats to pick up the ice bodies from the collecting space, lift them to an upper transfer position, and then drop them forwardly into the dispensing space to be received in the removable receiver disposed therein.

The invention is concerned with an improved arrangement of the belt structure to provide a positive transfer of the ice bodies from the collecting space to the dispensing space as desired by the user of the apparatus.

More specifically, each of the link plates defines a front edge and a rear edge. First ice body engaging cleats are disposed at the front edge extending forwardly at an angle of less than 90° to the plane of the plate. Second ice body engaging cleats are disposed at the rear edge to extend at an angle to the plane of the link plate greater than the angle of the first cleats thereto. In the illustrated embodiment, the front cleats extend at an angle of approximately 60° to the plane of the plate and the rear cleats extend at an angle of approximately 90° thereto.

The belt is driven in a loop which extends forwardly and upwardly at an angle to the vertical, which, in the illustrated embodiment, is approximately 30° to the vertical. The lower end of the loop is disposed in the collecting space and the upper end of the loop is disposed superjacent the dispensing space.

The rear cleats of a preceding plate are interdigitated with the front cleats of the succeeding plate so as to provide an aligned set of cleats extending across the belt effectively intermediate each of the pairs of link plates thereof. Thus, the ice bodies are picked up from the mass thereof in the collecting space on both the first and second cleats as the belt moves upwardly through the collecting space. The ice bodies picked up on the second cleats slide forwardly therefrom over the link plate to fall over the front edge of the link plate when the link plate reaches the upper end of the upright loop. The ice bodies thusly fall substantially directly into the dispensing space to be received in the receiver therein.

The ice bodies picked up on the front cleats slide forwardly over the preceding link plate to fall against the back of the front cleats of the preceding link plate when the plate moves slightly beyond the upper end of the loop so as to be deflected by the back of the front cleats of the preceding plate into the dispensing space and receiver.

The knuckles on the front and rear edges of the link plates define open hinges receiving the hinge pins for facilitated assembly and maintenance of the belt. The link plates are preferably formed of a readily cleanable material, such as stainless steel. The material is preferably relatively hard so as to provide sufficient force to break the ice bodies free from the collected mass of ice bodies in the collecting space without deformation of the cleats in normal use of the apparatus.

The sprockets define polygonal peripheries with each face of the sprocket having a length substantially equal to the length of the link plates so that as the belt moves around the sprockets, each plate extends along the entire length of the sprocket face with which it is engaged. The ice bodies carried on the rear perpendicular cleats tend to slide along the upper surface of the link plate as the link plate passes from the horizontal downwardly to a forwardly downwardly inclined disposition on the sprocket. In so sliding, the ice bodies are given sufficient momentum so as to fall directly into the receiving space.

The ice bodies carried on the inclined forward cleats tend to slide along the preceding link plate with at least a portion of the ice bodies falling against the back of forward cleats of the preceding plate so as to be deflected thereby into the receiving space. Thus, the cleats cooperatively define means for effectively transferring the ice bodies into the receiving space in an improved, highly efficient manner.

Thus, the improved belt construction of the present invention is extremely simple and economical of construction while yet providing the highly improved ice body transferring functioning discussed above.

BRIEF DESCRIPTION OF THE DRAWING

Other features and advantages of the invention will be apparent from the following description taken in connection with the accompanying drawing wherein.

DESCRIPTION OF THE PREFERRED EMBODIMENT

Figure 1:
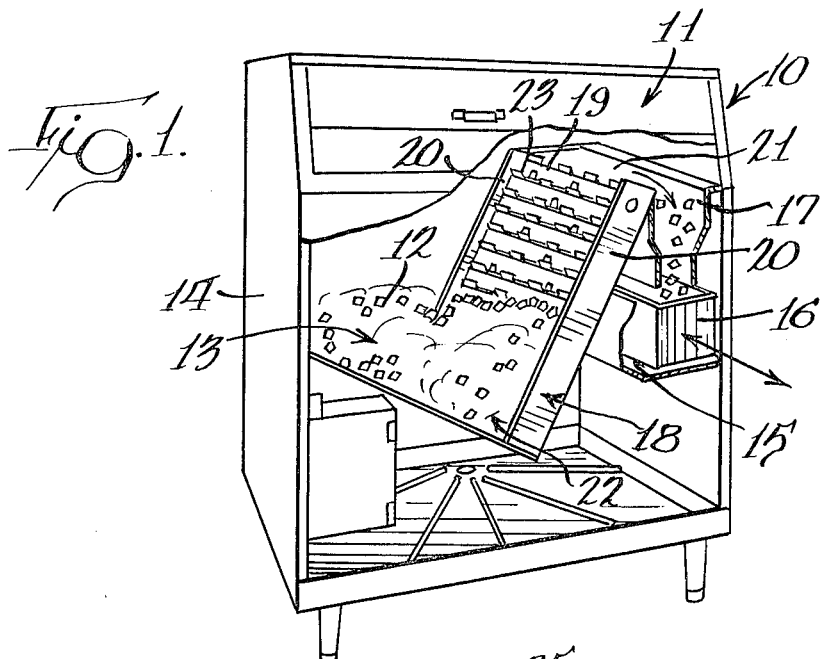
FIG. 1 is a perspective view of an ice body maker having a portion broken away to illustrate the disposition of a belt-type transfer means embodying the invention therein.

In the exemplary embodiment of the invention as disclosed in the drawing, an ice maker generally designated 10 is shown to comprise a commercial-type ice dispenser apparatus having an upper portion 11 defining an ice body maker adapted to deliver ice bodies 12 into a collecting space 13 within the outer housing 14 of the apparatus.

The collected ice bodies in space 13 are transferred to a dispensing space 15 adapted to removably receive a receiver 16 which may comprise an upwardly opening receptacle.

The ice bodies are transferred from collecting space 13 to a guide chute 17 extending downwardly to the receiving space 15, by a transfer mechanism 18 including a transfer belt 19 extending between a pair of sidewalls 20.

Figure 3:
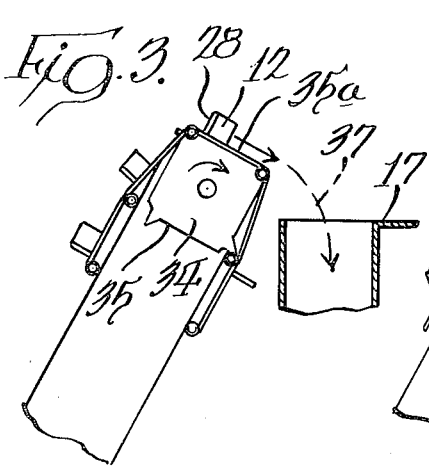
FIG. 3 is a fragmentary schematic view illustrating the delivery of ice bodies from the rear cleats of the belt means.
Figure 4:
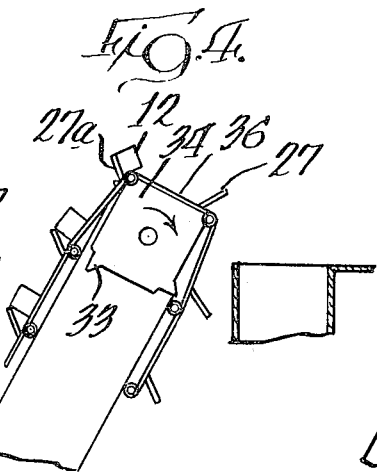
FIG. 4 is a schematic view illustrating a first step in the transfer of ice bodies from the forward inclined cleats.
Figure 5:
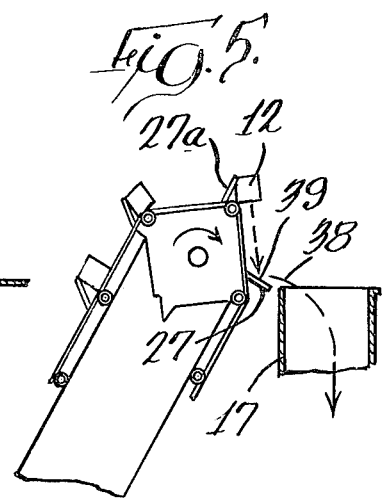
FIG. 5 is a schematic view illustrating a final step in the transfer of ice bodies from the forward cleats to the receiving space.

As shown in FIG. 1, the transfer mechanism extends upwardly forwardly from the collecting space to a transfer position 21. Thus, the lower end 22 of the belt is disposed to pick up ice bodies 12 from the collecting space 13 and transfer them into the guide chute 17 at the transfer position 21. The action of the belt in effecting this transfer is illustrated in FIGS. 3–5 and may be best understood by a detailed consideration of the construction of the belt elements, as illustrated in FIG. 2.

Thus, more specifically, the belt is comprised of a plurality of link plates 24 each defining a generally rectangular flat element. The plates are preferably formed of a readily maintainable material, such as stainless steel.

Each plate defines a front edge portion 25 and a rear edge portion 26. The front edge portion 25 is provided with a plurality of forwardly upwardly extending cleats 27 and the rear edge portion 26 is provided with a plurality of upwardly extending rear cleats 28. The front cleats preferably extend forwardly at an angle of less than 90° to the plane of the plate and, in the illustrated embodiment, extend at an angle of approximately 60° thereto. The rear cleats 28 preferably extend upwardly from the flat plane of the plate at an angle greater than the angle of the front cleats and, in the illustrated embodiment, extend perpendicularly thereto.

Figure 2:
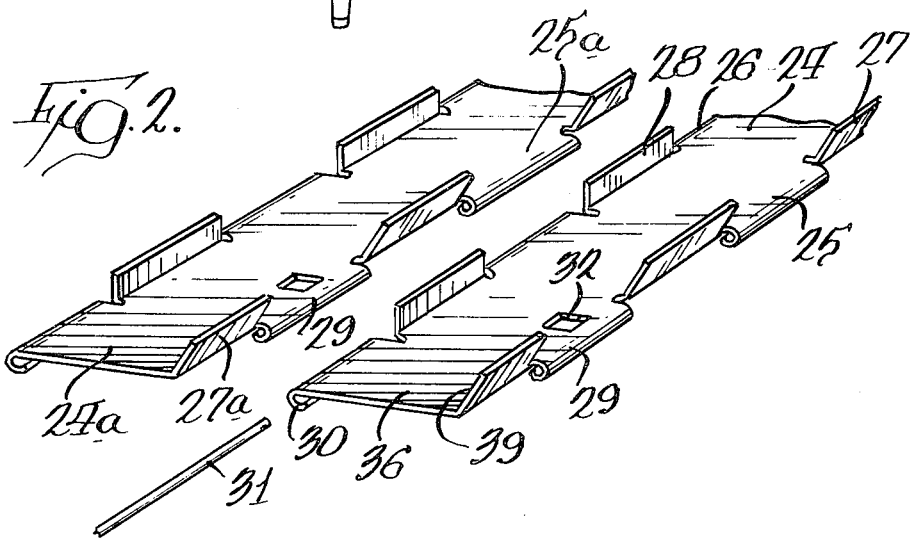
FIG. 2 is a fragmentary exploded view of the belt means.

As seen in FIG. 2, the front cleats 27 are offset from the rear cleats so that the front cleats, such as front cleats 27a of a succeeding link plate 24a, may be interdigitated with the rear cleats 28 of the preceding link plate, thereby providing an aligned array of cleats extending the width of the belt, as generally shown in FIG. 1, between each pair of link plates making up the loop belt 19.

The link plates are articulated to each other by means of open knuckles, including front knuckles 29, on the front edge portion 25 of the link plate, and rear knuckles 30 on the rear edge portion 26 thereof, the knuckles being disposed intermediate the cleats on each of the edge portions. Thus, the knuckles define an interdigitated, aligned array when the front edge portion 25a of a succeeding plate is interdigitated with the rear portion 26 of the preceding plate, thereby permitting the insertion of a suitable hinge pin 31 successively through the knuckles 29 and 30 of the respective preceding and succeeding link plates to effectively hingedly interconnect the plates in the belt.

As further shown in FIG. 2, each of the link plates may include a drive aperture 32 for engagement by suitable drive teeth 33 on the drive sprocket 34 at the upper end 23 of the transfer mechanism.

The link plates are preferably formed of a strong rigid material, and illustratively, where the plates are formed of stainless steel, the plates are preferably formed of a ¼ hard stainless steel. Thus, the cleats 27 and 28 may provide a substantial force to the mass of ice bodies 12 in the collecting space so as to break free any of the ice bodies which may have congealed to each other during storage in the collecting space without deformation deflection of the cleats in the normal use of the apparatus.

The improved arrangement of the cleats 27 and 28 provides an improved positive transfer of the ice bodies to the receiving space 15, as discussed above. This transfer of the ice bodies is illustrated in FIGS. 3, 4 and 5. Thus, as shown in FIG. 3, sprocket 34 effectively defines a polygonal periphery 35. In the illustrated embodiment, the sprocket is quadrilateral with each of the sides of the polygonal periphery having a length substantially equal to the length of the link plates so that, as shown in FIG. 3, when the link plate has facial engagement with the sprocket face, it extends substantially the length thereof.

The disposition of the transfer mechanism 18 in the forwardly inclined arrangement, as shown in FIG. 3, causes the link plate to extend forwardly downwardly at an angle of approximately 30° to the horizontal when the link plate is brought into facial engagement with the sprocket surface, such as surface 35a, as shown in FIG. 3. In this disposition, the ice bodies 12 previously carried on the rear cleats 28, slide forwardly and downwardly from the rear cleats along the upper surface 36 of the link plate to fall over the front edge portion 25 in a trajectory 37 into the guide 17, for delivery downwardly therethrough, as shown in FIG. 1, into the receiver 16 in the receiving space 15.

As shown in FIGS. 4 and 5, the ice bodies 12 carried on the forward cleats may slide along the link plate surface 36 to fall downwardly from the link plate and be deflected by the preceding forward cleat 27 in a trajectory 38 to pass through the guide chute 17 into the adjacent receiver 16. Thus, as shown in FIG. 5, the back side 39 of the front cleats 27 defines a deflector for causing the ice bodies to follow the modified trajectory 38 into the guide and receiver.

The knuckles 29 and 30 are preferably open knuckles, as illustrated in FIG. 2, to permit facilitated visual inspection of the hinge bearing surfaces. Ice cubes may be considered a food product, as they may be utilized in beverages and the like, and it is necessary to maintain utmost cleanliness in the ice dispensing appratus. Thus, the facilitated inspection of the hinges facilitates the visual observation of the bearing surfaces and the maintenance of the belt, when desired.

It is further contemplated within the scope of the invention to provide an odd number of link plates in the belt 19 to minimize cyclic center distance change during operation of the apparatus.

The use of the substantially square sprockets 34 permits an effective minimizing of the volume of transfer mechanism 18. Further, by utilizing the square shape, each of the surfaces, such as surface 35a of the sprocket, is relatively large, thereby effectively minimizing the number of separate link plates making up the belt and thereby effectively minimizing the cost of the apparatus. The use of the odd number of links in the belt accommodates the relatively heavy weight of the ice carried by the belt and the square shape of the sprockets effectively eliminates the need for varying the tension on the belt or effectively varying the length thereof during operation.

The foregoing disclosure of specific embodiments is illustrative of the broad inventive concepts comprehended by the invention.

I claim:

1. In an ice body maker having means defining an ice body collecting space, means for making ice bodies and delivering the ice bodies to said collecting space, and means defining an ice body dispensing space adapted to receive a removable ice body receiver, the improvement comprising:

a continuous flexible belt defined by a plurality of link plates articulated by cooperating knuckles and each having a front edge and a rear edge, first ice body engaging cleats at said front edge extending forwardly at an angle of less than 90° to the plane of the plate, and second ice body engaging cleats at said rear edge and extending at an angle to the plane of said link plate greater than the angle of said first cleats to the plane of the plate; and means for driving the belt in an upright loop having a lower end disposed in said collecting space and an upper end disposed superjacent said dispensing space, the second cleats of each preceding link plate being disposed in interdigitated alignment with the first cleats of the following link plate whereby ice bodies are picked up on said first and second cleats as the belt moves upwardly through said collecting space, the ice bodies picked up on said second cleats sliding forwardly therefrom over the link plate to fall over the front edge of the link plate substantially directly into said dispensing space when the link plate reaches said upper end of the upright loop and the ice bodies picked up on said first cleats sliding forwardly therefrom over the preceding link plate to fall against the back of the first cleats of the preceding link plate and be deflected thereby into said dispensing space when the link plate moves to and slightly beyond said upper end of the upright loop.

2. The ice body maker of claim 1 wherein said first cleats extend at an angle of approximately 60° to the plane of said plate.

3. The ice body maker of claim 1 wherein said second cleats extend substantially perpendicularly to the plane of said plate.

4. The ice body maker of claim 1 wherein said cleats are spaced apart along the front and rear edges of said plate.

5. The ice body maker of claim 1 wherein said cleats are spaced apart along the front and rear edges of said plate, said first cleats being aligned with the spaces between said second cleats and said second cleats being aligned with the spaces between said first cleats.

6. The ice body maker of claim 1 wherein said means for driving the belt includes upper and lower sprockets, each having a polygonal plate engaging periphery, each face of said periphery having a length substantially equal to that of said link plates.

7. The body maker of claim 1 wherein said means for driving the belt includes upper and lower sprockets, said upper sprocket being displaced forwardly above said lower sprocket whereby said loop is inclined upwardly forwardly at an angle to the vertical from said lower end to said upper end.

8. The ice body maker of claim 1 wherein said means for driving the belt includes upper and lower sprockets, said upper sprocket being displaced forwardly above said lower sprocket whereby said loop is inclined upwardly forwardly at an angle of approximately 60° to the vertical from said lower end to said upper end.

9. The ice body maker of claim 1 wherein said means for driving the belt includes upper and lower sprockets, said upper sprocket being displaced forwardly above said lower sprocket whereby said loop is inclined upwardly forwardly at an angle similar to the angle of said first cleats to the plate.

10. The ice body maker of claim 1 wherein said belt includes an odd number of link plates.

11. The ice body maker of claim 1 wherein said link plates are formed of ¼ hard stainless steel.

12. The ice body maker of claim 1 wherein said link plates define open knuckle hinge elements on said front and rear edges, and removable pins interconnecting said elements of successive ones of the link plates providing facilitated assembly and maintenance of said belt.

13. In wall means defining an ice body collecting space, the improvement comprising:

a continuous flexible belt defined by a plurality of link plates articulatd by cooperating knuckles and each having a front edge and a rear edge, first ice body engaging cleats at said front edge extending forwardly at an angle of less than 90° to the plane of the plate, and second ice body engaging cleats at said rear edge and extending at an angle to the plane of said link plate greater than the angle of said first cleats to the plane of the plate; and means for driving the belt in an upright loop having a lower end disposed in said collecting space and an upper end disposed for delivery of ice bodies to an adjacent ice body dispensing space, the second cleats of each preceding link plate being disposed in interdigitated alignment with the first cleats of the following link plate whereby ice bodies are picked up on said first and second cleats as the belt moves upwardly through said collecting space, the ice bodies picked up on said second cleats sliding forwardly therefrom over the link plate to fall over the front edge of the link plate substantially directly into said dispensing space when the link plate reaches said upper end of the upright loop and the ice bodies picked up on said first cleats sliding forwardly therefrom over the preceding link plate to fall against the back of the first cleats of the preceding link plate and be deflected thereby into said dispensing space when the link plate moves to and slightly beyond said upper end of the upright loop.

* * * * *